(12) United States Patent
Juzswik

(10) Patent No.: US 7,015,801 B1
(45) Date of Patent: Mar. 21, 2006

(54) VEHICLE-CONTROLLED TIRE CONDITION SENSOR COMMUNICATION UTILIZING FIXED TIRE IDENTIFICATION

(75) Inventor: David Leonard Juzswik, Commerce, MI (US)

(73) Assignee: TRW Inc., Lyndhurst, OH (US)

( * ) Notice: Subject to any disclaimer, the term of this patent is extended or adjusted under 35 U.S.C. 154(b) by 646 days.

(21) Appl. No.: 09/687,709

(22) Filed: Oct. 13, 2000

(51) Int. Cl.
  *B60C 23/00* (2006.01)
(52) U.S. Cl. ................. 340/442; 340/447; 340/825.49; 340/10.1; 340/444
(58) Field of Classification Search ................. 340/442, 340/445, 447, 448, 10.3, 10.4, 10.1, 825.49, 340/10.52, 444
See application file for complete search history.

(56) References Cited

U.S. PATENT DOCUMENTS

| | | | |
|---|---|---|---|
| 3,810,090 A * | 5/1974 | Davis, Jr. et al. | 340/447 |
| 4,761,644 A | 8/1988 | Kawai et al. | |
| 4,816,802 A * | 3/1989 | Doerksen et al. | 340/447 |
| 5,196,845 A | 3/1993 | Myatt | |
| 5,463,374 A | 10/1995 | Mendez et al. | |
| 5,557,552 A * | 9/1996 | Naito et al. | 340/438 |
| 5,573,610 A * | 11/1996 | Koch et al. | 340/447 |
| 5,602,524 A | 2/1997 | Mock et al. | |
| 5,612,671 A * | 3/1997 | Mendez et al. | 340/447 |
| 5,880,363 A | 3/1999 | Meyer et al. | |
| 5,883,305 A * | 3/1999 | Jo et al. | 340/447 |
| 5,924,055 A | 7/1999 | Hattori | |
| 6,011,483 A | 1/2000 | Tanaka et al. | |
| 6,362,733 B1 * | 3/2002 | Momose et al. | 340/447 |
| 6,435,020 B1 * | 8/2002 | Oldenettel et al. | 340/447 |
| 6,710,708 B1 * | 3/2004 | McClelland et al. | 340/442 |

FOREIGN PATENT DOCUMENTS

| | | | |
|---|---|---|---|
| EP | 1026015 | * | 1/2000 |
| EP | 1026015 A2 | | 8/2000 |

OTHER PUBLICATIONS

U.S. Appl. No. 09/753,290, filed Jan. 2, 2001 Dixit et al. entitled "Tire Condition Sensor Communication With Tire Location Provided Via Vehicle-Mounted Identification Units".
U.S. Appl. No. 09/752,951, filed Jan. 2, 2001 Dixit et al. entitled Tire Condition Sensor Communication with Tire Location Provided Via Manually Inputted Update.
An Internet press release from Siemens Automotive dated Jan. 24, 2001.
U.S. Appl. No. 09/727,251, filed Nov. 29, 2000, Juzswik "Vehicle Communicaiton For Tire Sensor Initiation And Vehicle Keyless Entry Via A Shared Resource".
U.S. Appl. No. 09/711,588, filed Nov. 14, 2000, DeZorzi "Tire Condition Sensor Communication With Duty-Cycle Amplified Tire-Side Reception".

* cited by examiner

*Primary Examiner*—Jeffery Hofsass
*Assistant Examiner*—Daniel Previl
(74) *Attorney, Agent, or Firm*—Tarolli, Sundheim, Covell & Tummino L.L.P.

(57) ABSTRACT

A tire condition sensor unit (e.g., 18A) is for use within a tire condition communication system (10). The sensor unit (e.g., 18A) is for association with a tire (e.g., 14A) of a vehicle (12) and, via a method, communicates a tire condition to a vehicle-based unit (28). A sensor (58) senses the tire condition. Radio frequency transmit circuitry and an antenna (68 and 22) transmit a radio frequency signal (e.g., 24A) that indicates the sensed tire condition. In one aspect, a low frequency antenna and a signal detector (48 and 52) receive a low frequency initiation signal that causes transmission of the radio frequency signal indicative of the sensed tire condition. In another aspect, the radio frequency signal is also indicative of a fixed identification.

46 Claims, 3 Drawing Sheets

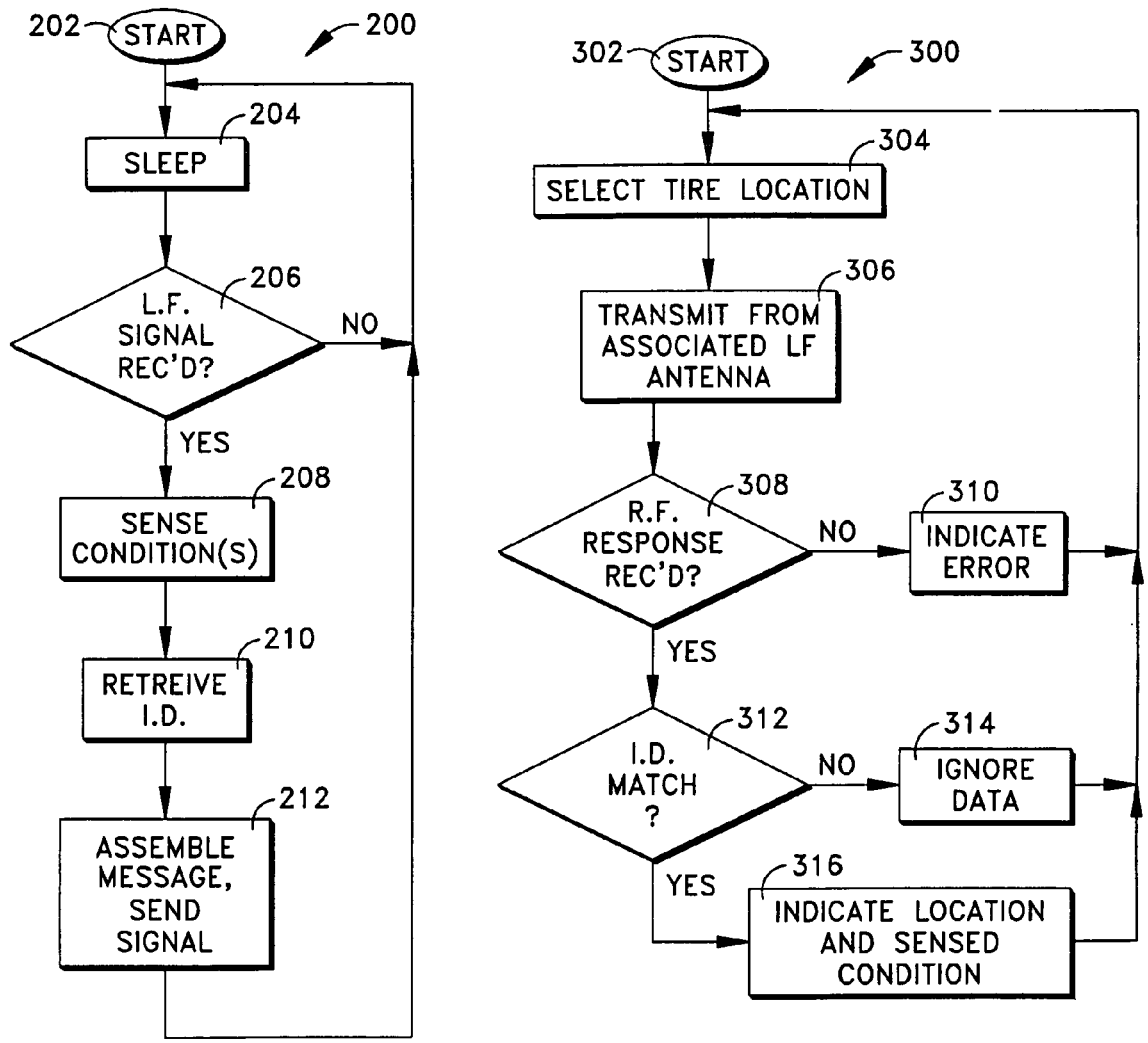

VEHICLE-CONTROLLED TIRE CONDITION SENSOR COMMUNICATION UTILIZING FIXED TIRE IDENTIFICATION

TECHNICAL FIELD

The present invention relates to a tire condition monitoring system for providing tire operation parameter information, such as tire inflation pressure, to a vehicle operator. The present invention relates specifically to a tire condition monitoring system that provides ready identification of a tire providing condition information and avoids misidentification regardless of previous tire position change due to tire position rotation or the like.

BACKGROUND OF THE INVENTION

Numerous tire condition monitoring systems have been developed in order to provide tire operation information to a vehicle operator. One example type of a tire condition monitoring system is a tire pressure monitoring system that detects when air pressure within a tire drops below a predetermined threshold pressure value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and little change in the visual appearance of the tire.

Typically, a tire pressure monitoring system includes a pressure sensing device, such as a pressure switch, an internal power source, and a communications link that provides the tire pressure information from a location at each tire to a central receiver. The central receiver is typically connected to an indicator or display located on a vehicle instrument panel.

The communications link between each tire and the central receiver is often a wireless link. In particular, radio frequency signals are utilized to transmit information from each of the tires to the central receiver. However, in order for the central receiver to be able to proper associate/identify received tire pressure information with the tire associated with the transmission, some form of identification of the origin of the signal must be utilized. A need for identification of the origin of the transmitted tire information signal becomes especially important subsequent to a tire position change, such as tire position rotation during routine maintenance.

SUMMARY OF THE INVENTION

In accordance with one aspect, the present invention provides a tire condition sensor unit for association with a tire of a vehicle. The tire condition sensor unit is for communication of a tire condition to a vehicle-based unit. Sensor means senses the tire condition. Radio frequency transmitter means, operatively connected to the sensor means, transmits a radio frequency signal that indicates the sensed tire condition. Low frequency receiver means, operatively connected to the radio frequency transmitter means, receives a low frequency initiation signal and causes the radio frequency transmitter means to transmit the radio frequency signal indicative of the sensed tire condition in response to receipt of the low frequency initiation signal.

In accordance with another aspect, the present invention provides a tire condition communication system for a vehicle. Sensor means, associated with a tire, senses at least one tire condition. Radio frequency transmitter means, associated with the tire and operatively connected to the sensor means, transmits a radio frequency signal that indicates the sensed tire condition. Communication means, having a first portion associated with the tire and operatively connected to the radio frequency transmitter means and a second portion associated with the vehicle, communicates a request from the vehicle to the radio frequency transmitter means to transmit the radio frequency signal that indicates the sensed tire condition.

In accordance with another aspect, the present invention provides a tire condition communication system for a vehicle. Sensor means, associated with a tire, senses at least one tire condition. Memory means, associated with the tire, holds a fixed identification associated with the tire. Radio frequency transmitter means, associated with the tire and operatively connected to the sensor means and the memory means, transmits a radio frequency signal that indicates the fixed identification and the sensed tire condition. Communication means, having a first portion associated with the tire and operatively connected to the radio frequency transmitter means and a second portion associated with the vehicle, communicates a request from the vehicle to the radio frequency transmitter means to transmit the radio frequency signal that indicates the fixed identification and the sensed tire condition.

In accordance with yet another aspect, the present invention provides a method of communicating tire condition information from a tire condition sensor unit to a vehicle-based unit. A low frequency initiation signal is output, in response to control from the vehicle-based unit, for reception by the tire condition sensor unit. A radio frequency response signal that conveys the tire condition information is output, in response to receipt of the low frequency initiation signal, from the tire condition sensor unit for reception by the vehicle-based unit.

In accordance with another aspect, the present invention provides a method of communicating tire condition information from a tire condition sensor unit to a vehicle-based unit. A low frequency signal is output, in response to control from the vehicle-based unit, for reception by the tire condition sensor unit. A radio frequency signal that conveys a fixed tire identification and the tire condition information is output from the tire condition sensor unit for reception by the vehicle-based unit.

In accordance with still another aspect, the present invention provides a method of communicating tire condition information from a plurality of tire condition sensor units to a vehicle-based unit. Low frequency initiation signals are sequentially output in response to control from the vehicle-based unit. Each low frequency initiation signal is for reception by a different tire condition sensor unit. A radio frequency response signal is output from each tire condition sensor unit in response to receipt of the respective low frequency initiation signal. Each radio frequency response signal conveys the tire condition information from the associated tire condition sensor unit for reception by the vehicle-based unit.

In accordance with yet still another aspect, the present invention provides a method of communicating tire condition information from a plurality of tire condition sensor units to a vehicle-based unit. Low frequency signals are sequentially output in response to control from the vehicle-based unit. Each low frequency signal is for reception by a different tire condition sensor unit. A radio frequency signal is output from each tire condition sensor unit. Each radio frequency response signal conveys a fixed tire identification and the tire condition information from the associated tire condition sensor unit for reception by the vehicle-based unit.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 4 is a flow chart for a process performed within the tire condition sensor unit of FIG. 2; and FIG. 5 is a flow chart for a process performed within the vehicle-based unit of FIG. 3.

DESCRIPTION OF AN EXAMPLE EMBODIMENT

Figure 1:
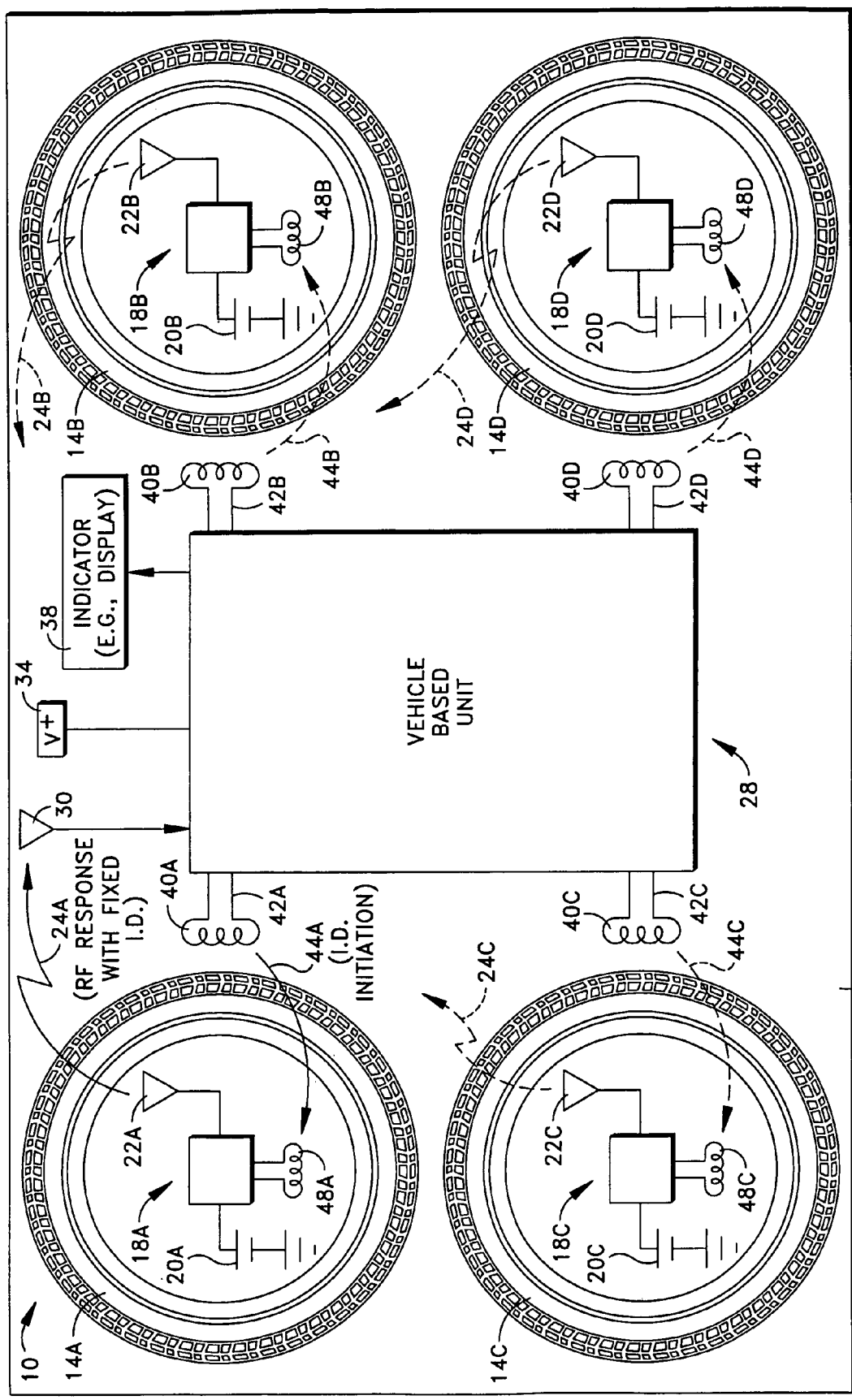
FIG. 1 is a schematic block diagram of a vehicle that contains a tire condition communication system with a plurality of tire condition sensor units in accordance with the present invention.

A tire condition communication system 10 is schematically shown within an associated vehicle 12 in FIG. 1. The vehicle 12 has a plurality of inflatable tires (e.g., 14A). In the illustrated example, the vehicle 12 has four tires 14A–14D. It is to be appreciated that the vehicle 12 may have a different number of tires. For example, the vehicle 12 may include a fifth tire (not shown) that is stored as a spare tire.

The system 10 includes a plurality of tire condition sensor units (e.g., 18A) for sensing one or more tire conditions at the vehicle tires (e.g., 14A). Preferably, the number of tire condition sensor units 18A–18D is equal to the number of tires 14A–14D provided within the vehicle 12. In the illustrated example, all of the tire condition sensor units 18A–18D have the same components. Identical components are identified with identical reference numerals, with different alphabetic suffixes. It is to be appreciated that, except as noted, all of the tire condition sensor units 18A–18D function in the same manner. For brevity, operation of one of the tire condition sensor units (e.g., 18A) is discussed in detail, with the understanding that the discussion is generally applicable to the other tire condition sensor units (e.g., 18B–18D).

Each tire condition sensor unit (e.g., 18A) includes a power supply (e.g., a battery 20A) that provides electrical energy to various components within the respective sensor unit. The electrical energy enables the tire condition sensor unit (e.g., 18A) to energize a radio frequency antenna (e.g., 22A) to emit a radio frequency signal (e.g., 24A) that conveys one or more sensed conditions along with a fixed identification to a central, vehicle-based unit 28. Specifically, a radio frequency antenna 30 receives the signal (e.g., 24A) from the tire condition sensor unit (e.g., 18A) and the conveyed information is processed. In one example, the system 10 is designed to operate with the signals (e.g., 24A) in the UHF portion of the radio frequency range. Thus, each antenna (e.g., 22A) in conjunction with the antenna 30 comprises part of a means for communication from the respective tire condition sensor unit (e.g., 18A) to the vehicle-based unit 28.

A power supply (e.g., a vehicle battery) 34, which is operatively connected to the vehicle-based unit 28, provides electrical energy to permit performance of the processing and the like. The vehicle-based unit 28 utilizes the processed information to provide information to a vehicle operator via an indicator device 38. In one example, the indicator device 38 may be a visual display that is located on an instrument panel of the vehicle 12. Accordingly, the vehicle operator is apprised of the sensed condition(s) at the tire (e.g., 14A).

It is to be noted that the sensed condition may be any condition at the tire (e.g., 14A). For example, the sensed condition may be inflation pressure of the tire (e.g., 14A), temperature of the tire, motion of the tire, or even a diagnostic condition of the tire condition sensor unit (e.g., 18A) itself.

Preferably, only a single antenna 30 of the vehicle-based unit 28 receives all of the radio frequency signals 24A–24D from the plurality of tire condition sensor units 18A–18D. In order for the vehicle-based unit 28 to accurately "know" which tire is providing the radio frequency signal, the system 10 includes a plurality of antennas 40A–40D that are operatively connected 42A–42D to the vehicle-based unit 28. Each antenna (e.g., 40A) is controlled to be energized by the vehicle-based unit 28 to output an initiation signal (e.g., 44A) that causes an associated one (e.g., 18A) of the tire condition sensor units to respond with its radio frequency signal (e.g., 24A). In other words, each initiation signal (e.g., 44A) is a request that causes a radio frequency signal response from the associated tire condition sensor unit (e.g., 18A). Thus, the information that is provided to the vehicle operator also includes tire location (e.g., left front). Accordingly, the vehicle operator is made aware of the tire condition (e.g., low inflation pressure) of the certain tire, without having to separately determine which tire is associated with the tire condition.

Preferably, each initiation signal (e.g., 44A) is a low frequency signal that is provided in the form of a magnetic field or magnetic induction signal. The frequency of the initiation signals (44A–44D) is much lower that the frequency of the radio frequency signals (24A–24D) that convey the tire condition information to the vehicle-based unit 28. In one example, the frequencies of the initiation signals 44A–44D are each at or near 125 kHz. Accordingly, in one example, the antennas 40A–40D are magnetic field induction coils. Hereinafter, the antennas 40A–40D are referred to as low frequency antennas. However, it is contemplated that other frequencies (e.g., 13 MHz) above or below the above-mentioned frequency may be utilized.

Each low frequency antenna (e.g., 40A) is mounted on the vehicle 12 at a location adjacent to a respective one (e.g., 14A) of the vehicle tires. In one example, each low frequency antenna (e.g., 40A) is mounted within the wheel well associated with the respective tire (e.g., 14A). Signal strength of each low frequency initiation signal (e.g., 44A) drops considerably as the distance from the outputting low frequency antenna (e.g., 40A) increases. Specifically, magnetic field signal strength decreases as a function of the inverse of the cube of the distance ($1/D^3$) from the antenna. Accordingly, the low frequency initiation signals (e.g., 44A) are output at a strength to only permeate the space within the associated wheel well, about the associated tire. The low frequency initiation signals (e.g., 44A) are preferably not output at a strength to noticeably permeate the space about any of the other tires (e.g., 14B–14D).

Each tire condition sensor unit (e.g., 18A) includes a low frequency reception antenna (e.g., 48A) for receiving the low frequency initiation signal (e.g., 44A) that is output from the low frequency antenna (e.g., 40A) located adjacent to the respective tire (e.g., 14A) to which the tire condition sensor unit is associated. Preferably, the low frequency reception antennas 48A–48D are magnetic induction coils. Thus, each associated pair of low frequency antennas (e.g., 40A and 48A) comprise part of a means for communication from the vehicle-based unit 28 to the respective tire condition sensor unit (e.g., 18A).

It is to be noted that in a preferred example, the communication from the vehicle-based unit 28 to the respective tire condition sensor unit (e.g., 18A) is a stimulus only and does not convey information, such as identification information. The pairing of low frequency antennas (e.g., 40A and 48A) as means for communication from the vehicle-based unit 28 to the respective tire condition sensor unit (e.g., 18A) provides sufficient ability to properly select a tire location.

In operation, when the vehicle-based unit 28 "desires" to receive sensory information from the tire (e.g., 14A) at a certain tire mount location (e.g., left front), the vehicle-based unit causes the low frequency antenna (e.g., 40A) associated with that location to output the low frequency initiation signal (e.g., 44A). In response to reception of the low frequency initiation signal (e.g., 44A), the tire condition sensor unit (e.g., 18A) outputs the radio frequency signal (e.g., 24A) as a response.

As mentioned, the radio frequency signal (e.g., 24A) conveys the sensed condition information. Accordingly, attendant with causing output of a low frequency initiation signal (e.g., 44A) from a certain one of the low frequency antennas (e.g., 40A), the vehicle-based unit 28 "anticipates" a radio frequency response signal (e.g., 24A) from the tire condition sensor unit (e.g., 18A) that is associated with the certain low frequency antenna. For example, when the vehicle-based unit 28 stimulates the low frequency antenna at a right, rear tire location, the vehicle-based unit anticipates that the tire condition sensor unit at the right, rear tire will output its radio frequency signal. In a preferred example, the vehicle-based unit 28 sequentially (e.g., in a series) stimulates the low frequency antennas 40A–40D, and accordingly sequentially receives the radio frequency response signals 24A–24D.

It is contemplated that an initiation signal may be received from a different system (not shown) located on a different vehicle (not shown) that is located in close proximity to the subject vehicle 12. Such an occurrence may cause the tire condition sensor unit that is the unintended recipient of the initiation signal to output a radio frequency response signal. Also, it is contemplated that the vehicle-based unit 28 may receive a stray radio frequency signal from the tire condition sensor unit (not shown) of the different system located on the different vehicle (not shown), even if the tire condition sensor unit of the different system did not receive an initiation signal from the subject vehicle.

In order to help ensure correct provision and use of tire condition information, each radio frequency signal (e.g., 24A) conveys a fixed identification. The vehicle-based unit 28 has been taught or has learned to recognize the fixed identifications of the tires 14A–14D associated with the vehicle 12 within which the system is provided. However, even if the tires 14A–14D are rotated, the vehicle-based unit 28 is still able to correctly identify the location (e.g., left-front) of the tire (e.g., 14A) and associated tire condition sensor unit (e.g., 18A) because of the stimulus-response relationship that is provided by the low frequency initiation signal (e.g., 44A) causing the radio frequency response signal (e.g., 24A). The fixed identification is utilized to verify that the tire condition sensor unit (e.g., 18A) that provided the radio frequency response signal (e.g., 24A) is associated with a tire (e.g., 14A) on the vehicle 12. For example, the vehicle-based unit 28 is able to recognize a signal mistakenly sent from one tire condition sensor unit (e.g., 24C) due to noise. Such recognition occurs even if the mistakenly sent signal occurs when the vehicle-based unit is expecting a signal from another tire condition sensor unit (e.g., 24A).

Figure 2:
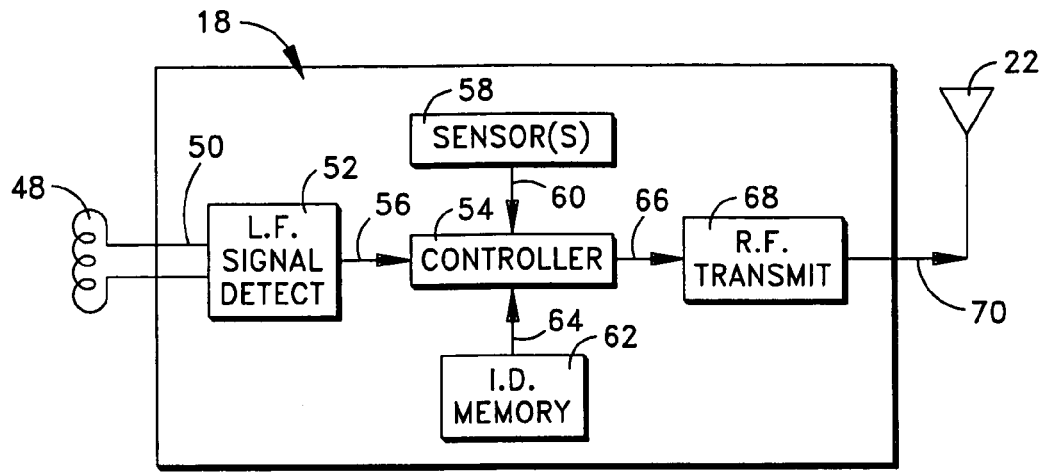
FIG. 2 is a function block diagram for one of the tire condition sensor units shown in FIG. 1.

FIG. 2 schematically illustrates one example of the tire condition sensor units 18 (generically shown without alphabetic suffixes on the reference numerals). Specifically, the low frequency reception antenna 48 is operatively connected 50 to a low frequency signal detector 52. A controller 54 is operatively connected 56 to the low frequency signal detector 52. In response to the low frequency signal detector 52 detecting an initiation signal, the controller 54 receives sensory information from one or more sensors 58 that are operatively connected 60 to the controller 54.

The controller 54 also receives a fixed identification from a fixed identification memory 62 that is operatively connected 64 to the controller 54. In one preferred example, the fixed identification memory 62 is a permanent, read only memory. The controller 54 is further operatively connected 66 to radio frequency transmit circuitry 68.

A message packet that contains the sensory information and the fixed identification is assembled by the controller 54 and provided to the radio frequency transmit circuitry 68. In response to the provided message package, the radio frequency transmit circuitry 68 provides an electrical stimulus signal 70 to the antenna 22 that causes the antenna to output the radio frequency response signal that conveys the sensory information and the fixed identification. Thus, the low frequency antenna 48/low frequency signal detector 52, the sensor(s) 58, the fixed identification memory 62, and the radio frequency transmit circuitry 68/radio frequency antenna 22 are operatively connected together through the controller 54. Again, the operation is such that the receipt of the initiation signal (e.g., 44A, FIG. 1) causes the output of the radio frequency response signal (e.g., 24A).

Figure 3:
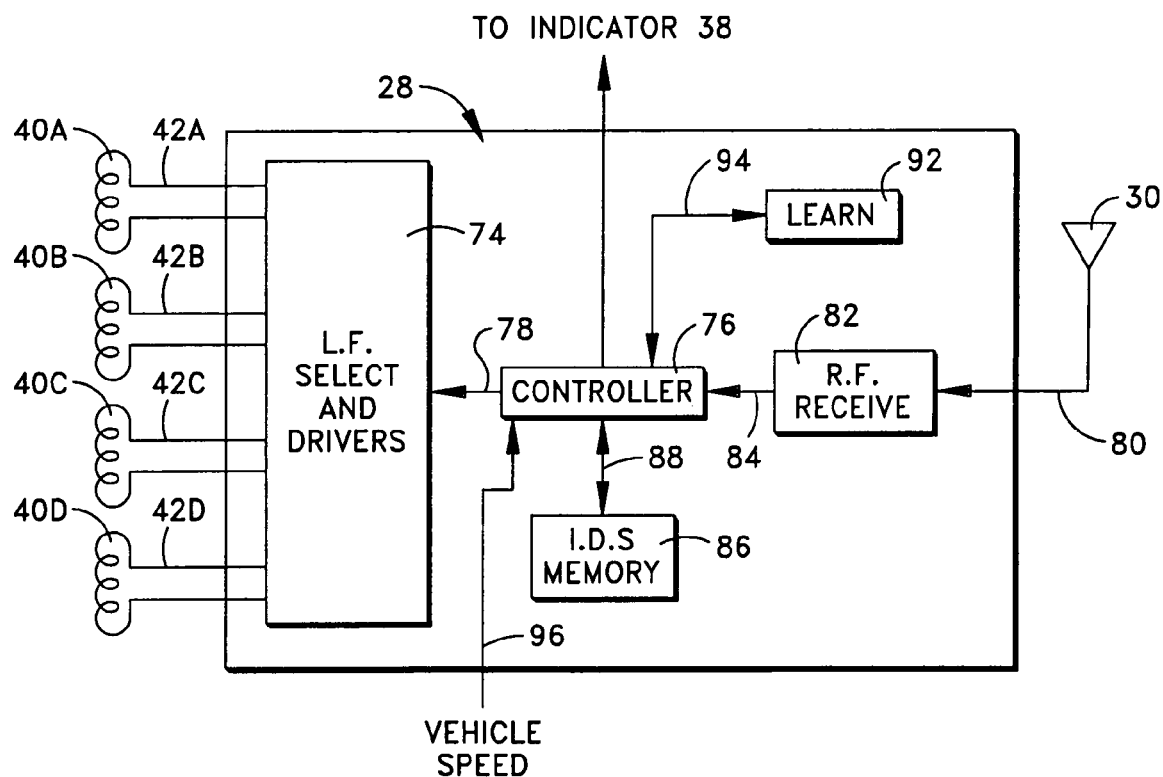
FIG. 3 is a function block diagram of a central, vehicle-based unit of the system shown in FIG. 1.

FIG. 3 schematically illustrates one example of the vehicle-based unit 28. Specifically, a low frequency selection and driver component 74 is operatively connected 42A–42D to the plurality of low frequency antennas 40A–40D. A controller 76 of the vehicle-based unit 28 is also operatively connected 78 to the low frequency selection and driver component 74. The controller 76 provides a control signal to the low frequency selection and driver component 74 to cause a stimulation signal to be provided to one of the low frequency antennas (e.g., 40A). Thus, a communication interaction with one of the tire condition sensor units is initiated.

The antenna 30 is operatively connected 80 to radio frequency receive circuitry 82 at the vehicle-based unit 28. The radio frequency response signal that is received by the antenna 30 is provided as an electrical stimulation signal to the radio frequency receive circuitry 82. In turn, the radio frequency receive circuitry 82 is operatively connected 84 to the controller 76 such that the contents of the received radio frequency response signal are conveyed to the controller 76.

The controller 76 processes the received information from the radio frequency response signal. In particular, the controller 76 compares the signal-conveyed identification to an identification provided from an identifications memory 86 that is operatively connected 88 to the controller 76. If the identification (i.e., from a tire condition sensor unit located at a tire on the vehicle) is a valid identification, the controller 76 further processes the information conveyed via the signal and provides an appropriate control signal to the indicator device 38. The signal conveys tire location and condition information. For example, if the sensed condition is inflation pressure, the controller 76 provides control signals such that the indicator device 38 provides an indication of the sensed pressure and the location of the tire.

It is contemplated that the vehicle-based unit 28 includes one or more components (e.g., 92) operatively (e.g., 94) connected to the controller 76, and/or one or more connections (e.g., 96) from other vehicle systems to the vehicle-based unit that permit the vehicle-based unit to accomplish various additional functions. For example, a learn mode component 92 may be utilized to cause the vehicle-based unit 28, and thus the system 10, to perform function(s) such that correct and current identifications are stored in the memory 86 and used in the system 10.

As one example of a connection 96 from another vehicle system, a vehicle speed (e.g., from a transmission sensor) is provided to the controller 76. The controller 78 may use the speed indication to modify the rate of initiating communication with the sensor units to receive updates on the sensed tire condition. In one embodiment, frequency of occurrence of updating is proportional to the vehicle speed.

Turning to FIG. 4, a process 200 performed within the tire condition sensor unit 18 of FIG. 2 is initiated at step 202 and proceeds to step 204. At step 204, the tire condition sensor unit 18 is in a sleep mode, in order to conserve battery power. At step 206, it is determined whether a low frequency initiation signal has been received. If the determination at step 206 is negative (i.e., an initiation signal is not received), the unit remains in the sleep mode (i.e., the process 200 proceeds from step 206 to step 204).

If the determination at step 206 is affirmative (i.e., an initiation signal is received) the process 200 proceeds from step 206 to step 208. At step 208, the one or more conditions are sensed. At step 210, the fixed tire identification is retrieved from memory. At step 212, the message packet is assembled and the response signal is transmitted. Upon completion of step 212, the process 200 again enters a sleep mode (i.e., the process 200 proceeds from step 212 to step 204).

An example of a process 300 performed within the vehicle-based unit 28 is shown in FIG. 5. The process 300 is initiated at step 302 and proceeds to step 304. At step 304, a tire location is selected. At step 306, the low frequency antenna (e.g., 40A) associated with that tire location is energized to transmit its initiation signal (e.g., 44A). At step 308, it is determined whether a radio frequency response signal (e.g., 24A) is received within a certain time period. If the determination at step 308 is negative (an anticipated radio frequency response signal has not been received), the process 300 proceeds from step 308 to step 310. At step 310, an error message is provided via the indicator device 38 such that the vehicle operator is apprised of the non-receipt of a tire condition signal. Upon completion of step 310, the process 300 goes to step 304 to select a tire location.

If a radio frequency response signal is received, the determination at step 308 is affirmative. Upon an affirmative determination at step 308, the process 300 proceeds to step 312. At step 312, it is determined whether the fixed identification provided via the radio frequency response signal is valid (i.e., does the identification match an identification from the memory 86 at the vehicle-based unit 28). If the determination at step 312 is negative (i.e., the identification is invalid), the process 300 proceeds from step 312 to step 314. At step 314, the information data is ignored. Upon completion of step 314, the process 300 proceeds to step 304.

However, if the receive radio frequency response signal (e.g., 24A) conveys a valid fixed identification, the determination at step 312 is affirmative. Upon the affirmative determination at step 312, the process 300 proceeds to step 316 wherein the information is provided to the vehicle operator via the indicator device 38. Upon completion of step 316, the process 300 proceeds to step 304.

The present invention permits the vehicle-based unit 28, at the vehicle 12 to control the rate of sensor update. The control provided by the vehicle-based unit 28 prevents signal collisions, and thus reduces the need for repeated signal transmissions. If interference of a signal does occur, communication can immediately be re-initialized. Further, the system can truly be operated in an ignition key-on mode, because radio frequency transmission is controlled from the "vehicle side."

Also, because of the vehicle side control, the need for radio frequency wake-up messages may be reduced, the size of radio frequency messages may be reduced, and the efforts needed to synchronize messages may be reduced. Such features mentioned above may help to prolong battery life at the tire condition sensor units 18A–18D.

Still further, because of the vehicle side control, the invention may be easily integrated with other/existing radio frequency systems, such as remote convenience systems. Specifically, the vehicle side control could help ensure sensed tire condition signals are not transmitted during receipt of a remote convenience control signal. In one example, tire condition monitoring (e.g., inflation pressure monitoring) is typically performed when the ignition is ON and remote convenience functions (e.g., remote keyless entry) is typically performed when the ignition is OFF.

The vehicle-based unit 18 can interface with one or more existing vehicle systems to derive information that is usable to determine need to update, frequency of updating, etc. For example, the vehicle-based unit 18 may interface a vehicle speed sensing system to vary update frequency based upon vehicle velocity (e.g., increased rate of update for increased vehicle speed).

Also, the present invention helps avoid the need for a person (e.g., vehicle operator or service technician) to initiate a location identification learning scenario upon the occurrence of a tire location change (e.g., a routine tire location rotation). Still further, small size of tire condition sensor units can be achieved via the removal of components that may no longer be needed, such as centrifugal switches.

The present invention also provides for an easy identification learn mode. For example, the initial learning of identification codes at the assembly location of the system (e.g., at a vehicle assembly facility) does not require preceding identification numbers into the vehicle-based unit. The sensor units at the installed tires are merely sequentially polled (e.g., communicate is a cycle) to transmit to the vehicle-based unit. Upon receipt of each signal, the vehicle-based unit is apprised of the identification that is currently associated with that tire location and stores that identification and location as a pair in memory. There is no need for specialized equipment for the learning mode. Thus, an assembly facility (e.g., an original equipment manufacture plant) does not require significant capital improvements to include the present invention into vehicle manufacture.

The present invention also provides for ease in learning a new/replacement identification. A new/replacement identification can be utilized when a sensor unit, or an entire tire with sensor unit, is replaced. Upon replacement, the vehicle-based unit will receive a new identification each time an initiation signal is sent to that tire location. Initially, it is contemplated that the vehicle-based unit may disregard the response as it contains a previously unrecognized identification. However, the vehicle-based unit counts the number of occurrences of responses that contain the new identification and after a predetermined number of occurrences of the new identification, the vehicle-based unit accepts the new identification and stores the new identification and the location as a memory pair.

From the above description of the invention, those skilled in the art will perceive improvements, changes and modifications. For example, although it is preferred that the low frequency antennas are used to merely initiate the communication of sensed tire condition information and the fixed identification from the tire condition sensor units, it is contemplated that the low frequency antennas could be used to convey information to the tire condition sensor units. Such improvements, changes and modifications within the skill of the art are intended to be covered by the appended claims.

What is claimed is:

1. A tire condition communication system for a vehicle, said system comprising:
   sensor means, associated with a tire, for sensing at least one tire condition;
   radio frequency transmitter means, associated with the tire and operatively connected to said sensor means, for transmitting a radio frequency signal that indicates the sensed tire condition; and
   communication means, having a first portion associated with the tire and operatively connected to said radio frequency transmitter means and a second portion associated with the vehicle, for communicating requests from the vehicle to said first portion of said communication means, each request causing said radio frequency transmitter means to transmit the radio frequency signal that indicates the sensed tire condition, said second portion of said communication means being operatively connected to a vehicle condition sensor that is adapted to sense a condition of the vehicle, said second portion of said communication means communicating requests from the vehicle at a rate that varies in response to the sensed condition of the vehicle.

2. A tire condition communication system as set forth in claim 1, wherein the requests are low frequency initiation signals and wherein said first portion of said communication means includes low frequency receiver means for receiving a low frequency initiation signal and for causing said radio frequency transmitter means to transmit the radio frequency signal in response to receipt of the low frequency initiation signal.

3. A tire condition communication system as set forth in claim 2, wherein said communication means includes first and second magnetic induction antennas.

4. A tire condition communication system as set forth in claim 1, including radio frequency receiver means, associated with the vehicle, for receiving the radio frequency signal that indicates the sensed tire condition.

5. A tire condition communication system as set forth in claim 4, wherein said sensor means senses tire inflation pressure as the sensed tire condition.

6. A tire condition communication system as set forth in claim 4, including indicator means for providing and indication of sensed tire condition.

7. A tire condition communication system as set forth in claim 6, wherein said indicator means is also for indicating tire location.

8. A tire condition communication system as set forth in claim 6, wherein said radio frequency transmitter means is also for transmitting an identification associated with the tire, said system including means for using the identification to determine tire location, and said indicator means also indicating tire location.

9. A tire condition communication system as set forth in claim 8, including means for storing identifications and associating identifications with respective tire locations.

10. A tire condition communication system as set forth in claim 9, including means for updating the stored identifications.

11. A tire condition communication system as set forth in claim 10, wherein said means for updating the stored identifications includes means for monitoring the number of times an identification is received at said second portion of said communication means.

12. A tire condition communication system as set forth in claim 1, said vehicle condition sensor sensing a speed of the vehicle and said second portion of said communication means utilizing vehicle speed to vary the rate that the requests are communicated.

13. A tire condition communication system as set forth in claim 1, including memory means, associated with the tire, for holding a fixed identification associated with the tire, said radio frequency transmitter means also for transmitting the radio frequency signal to indicate the fixed identification.

14. A tire condition communication system as set forth in claim 13, including memory means, associated with the vehicle, for holding identification values for comparison with the fixed identification indicated by the received radio frequency signal.

15. A tire condition communication system as set forth in claim 13, wherein said memory means is capable of learning new identifications.

16. A tire condition communication system as set forth in claim 13, wherein said communication means does not convey identification information.

17. A tire condition communication system as set forth in claim 13, wherein the requests are low frequency initiation signals and wherein said first portion of said communication means includes low frequency receiver means for receiving a low frequency initiation signal and for causing said radio frequency transmitter means to transmit the radio frequency signal in response to receipt of the low frequency initiation signal.

18. A tire condition communication system as set forth in claim 17, wherein said communication means includes first and second magnetic induction antennas.

19. A tire condition communication system as set forth in claim 13, including radio frequency receiver means, associated with the vehicle, for receiving the radio frequency signal that indicates the fixed identification and the sensed tire condition, and memory means, associated with the vehicle, for holding identification values for comparison with the fixed identification indicated by the received radio frequency signal.

20. A tire condition communication system as set forth in claim 13, wherein said memory means is capable of learning new identifications.

21. A tire condition communication system as set forth in claim 13, including means for counting the number of receptions of an identification to determine whether to learn a new identification.

22. A tire condition communication system as set forth in claim 13, wherein said communication means does not convey identification information.

23. A tire condition communication system as set forth in claim 13, wherein said sensor means senses tire inflation pressure as the sensed tire condition.

24. A tire condition communication system as set forth in claim 13, including indicator means for providing an indication of sensed tire condition.

25. A tire condition communication system as set forth in claim 24, wherein said indicator means is also for providing an indication of tire location with the indication of sensed tire condition.

26. A tire condition communication system as set forth in claim 13, wherein said vehicle condition sensor senses a speed of the vehicle and the vehicle condition is vehicle speed.

27. A method of communicating tire condition information from a tire condition sensor unit to a vehicle-based unit of a tire communication system of a vehicle, said method comprising:
    sensing a condition of the vehicle;
    outputting from the vehicle based-unit, at a rate that varies in response to the sensed condition of the vehicle, low frequency initiation signals for reception by the tire condition sensor unit; and
    outputting, in response to receipt of a low frequency initiation signal, a radio frequency response signal that conveys the tire condition information from the tire condition sensor unit for reception by the vehicle-based unit.

28. A method as set forth in claim 27 including:
    conveying in the radio frequency response signal a fixed tire identification.

29. A method as set forth in claim 28, including comparing the conveyed tire identification with a stored identification at the vehicle.

30. A method as set forth in claim 29, including updating the stored identification at the vehicle via provision of a new identification from a tire condition sensor unit.

31. A method as set forth in claim 27, including indicating the sensed condition and tire location to a vehicle operator.

32. A method as set forth in claim 27, wherein sensing a condition of the vehicle includes sensing vehicle speed and further including controlling the step of outputting the low frequency signals for reception by the tire condition sensor unit in response to sensed vehicle speed.

33. A method of communicating tire condition information from a plurality of tire condition sensor units to a vehicle-based unit of a tire communication system of a vehicle, said method comprising:
    sensing a condition of the vehicle;
    sequentially outputting from the vehicle based-unit, at a rate that varies in response to the sensed condition of the vehicle, low frequency initiation signals, each low frequency initiation signal being for reception by one of the plurality of tire condition sensor units; and
    each tire condition sensor unit outputting, in response to receipt of a respective low frequency initiation signal, a radio frequency response signal that conveys the tire condition information from that tire condition sensor unit for reception by the vehicle-based unit.

34. A method as set forth in claim 33, wherein said step of outputting the radio frequency response signal includes outputting the response signal to convey a fixed tire identification.

35. A method as set forth in claim 34, including indicating the sensed conditions and tire locations to a vehicle operator.

36. A method as set forth in claim 34, including comparing the conveyed tire identification with stored identifications at the vehicle.

37. A method as set forth in claim 33, including updating a stored identification at the vehicle via provision of a new identification from a tire condition sensor unit.

38. A method as set forth in claim 33, wherein sensing a condition of the vehicle includes sensing vehicle speed and further including controlling the step of outputting the low frequency signals for reception by the tire condition sensor units in response to the sensed vehicle speed.

39. A tire condition communication system for a vehicle, said system comprising:
    a tire based unit including sensor means for sensing a tire condition, radio frequency transmitter means, operatively connected to said sensor means, for transmitting a radio frequency signal that indicates the sensed tire condition, and low frequency receiver means, operatively connected to said radio frequency transmitter means, for receiving a low frequency initiation signal and for causing said radio frequency transmitter means to transmit the radio frequency signal indicative of the sensed tire condition in response to receipt of the low frequency initiation signal; and
    a vehicle based unit including a vehicle condition sensor for sensing a condition of the vehicle, low frequency transmitter mean for transmitting low frequency initiation signals, and radio frequency receiver means for receiving the radio frequency signal indicative of the sensed tire condition from said tire based unit,
    said low frequency transmitter means of said vehicle based unit transmitting the low frequency initiation signals to said tire based unit at a rate that varies in response to the sensed condition of the vehicle.

40. A tire condition communication system as set forth in claim 39, wherein the vehicle condition sensor is a vehicle speed sensor for sensing the speed of the vehicle, said low frequency transmitter means of said vehicle based unit transmitting the low frequency initiation signals to said tire based unit at a rate that varies in response to the sensed vehicle speed.

41. A tire condition communication system as set forth in claim 39, wherein said low frequency receiver means and said low frequency transmitter means include first and second magnetic induction antennas, respectively.

42. A tire condition communication system as set forth in claim 39, wherein said tire based unit also includes a memory in which an identification of said tire based unit is stored, said radio frequency transmitter means including the identification of said tire based unit in the radio frequency signal.

43. A tire condition communication system as set forth in claim 42, wherein said vehicle-based unit includes means for storing the identification of said tire based unit after receiving the identification in the radio frequency signal.

44. A tire condition communication system as set forth in claim 43, wherein said vehicle based unit includes means for pairing the stored identification with a tire location.

45. A tire condition communication system as set forth in claim 39, wherein said tire based unit further includes controller means operatively connected to said sensor means, said radio frequency transmitter means, and said low frequency receiver means and controlling operation of said sensor means and said radio frequency transmitter means.

46. A tire condition communication system as set forth in claim 39, wherein said sensor means senses tire inflation pressure as the sensed tire condition.

* * * * *